(12) United States Patent
Niiho et al.

(10) Patent No.: US 7,439,485 B2
(45) Date of Patent: Oct. 21, 2008

(54) MULTIMODE OPTICAL TRANSMISSION APPARATUS AND MULTIMODE OPTICAL TRANSMISSION SYSTEM

(75) Inventors: Tsutomu Niiho, Osaka (JP); Kouichi Masuda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 25 days.

(21) Appl. No.: 11/474,458

(22) Filed: Jun. 26, 2006

(65) Prior Publication Data

US 2006/0289730 A1    Dec. 28, 2006

(30) Foreign Application Priority Data

Jun. 27, 2005  (JP) .............................. 2005-185848

(51) Int. Cl.
*G01J 1/44* (2006.01)
*G01J 4/00* (2006.01)

(52) U.S. Cl. .............................. 250/227.18; 250/214 R (58) Field of Classification Search .................. 250/205, 250/227.11, 214 R, 227.189, 227.23, 227.21, 250/227.12; 385/1–3, 8; 356/221, 226; 398/135, 398/137, 139, 141, 143, 147, 202, 209, 213
See application file for complete search history.

(56) References Cited

U.S. PATENT DOCUMENTS 6,748,173 B2 *  6/2004  Ishii et al. ..................... 398/79

FOREIGN PATENT DOCUMENTS

JP    09-214427    8/1997

OTHER PUBLICATIONS

D.R. Hjelme et al., "Microbending and modal noise", Applied Optics, vol. 22, No. 23, Dec. 1, 1983, pp. 3874-3879.

* cited by examiner

*Primary Examiner*—Que T. Le
*Assistant Examiner*—Pascal M Bui-Pho
(74) *Attorney, Agent, or Firm*—Wenderoth, Lind & Ponack, L.L.P.

(57) ABSTRACT

A multimode optical transmission system reduces a deterioration of a noise characteristic and a distortion characteristic caused by an interference between modes. In an optical transmitter, a signal output section outputs a predetermined signal based on an inputted electrical signal. A control section controls the signal output section so as to adjust a frequency component of the signal outputted by the signal output section based on group delay information of modes which propagate in a multimode optical transmission line. An electric-optic conversion section converts, into an optical signal, the signal outputted by the signal output section, and transmits the optical signal via the multimode optical transmission line.

17 Claims, 8 Drawing Sheets

MULTIMODE OPTICAL TRANSMISSION APPARATUS AND MULTIMODE OPTICAL TRANSMISSION SYSTEM

BACKGROUND OF THE INVENTION

1. Field of the Invention

The present invention relates to a multimode optical transmission apparatus and a multimode optical transmission system for transmitting an optical signal via a multimode optical transmission line, and more particularly relates to a multimode optical transmission apparatus and a multimode optical transmission system for reducing a deterioration of a noise characteristic and a distortion characteristic caused by an interference between modes.

2. Description of the Related Art

Figure 9:
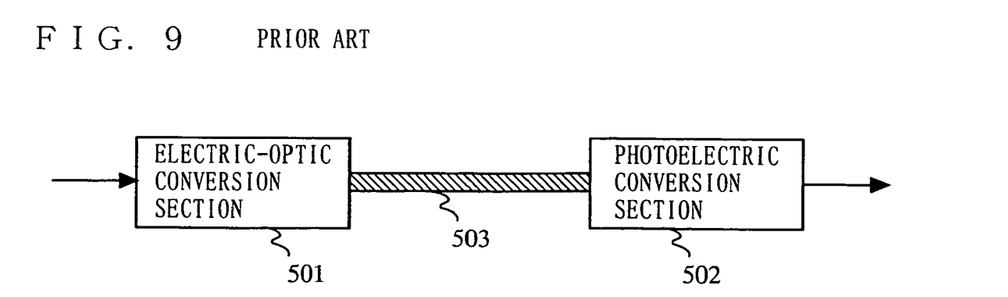
FIG. 9 is a block diagram illustrating an exemplary structure of an optical transmission system using a conventional multimode optical fiber.

For example, in D. R. Hjelme, and A. R. Mickelson, "Microbending and modal noise", Applied Optics, Vol. 22, No. 23, Dec. 1, 1983, pp. 3874-3879 (hereinafter, referred to as "Non-patent Document 1"), an optical transmission system using a conventional multimode optical fiber is disclosed. FIG. 9 is a block diagram illustrating an exemplary structure of the conventional optical transmission system disclosed in Non-patent Document 1. As shown in FIG. 9, the conventional optical transmission system includes an electric-optic conversion section 501 and a photoelectric conversion section 502, which are connected to each other via a multimode optical transmission line 503.

An electrical signal is inputted to the electric-optic conversion section 501. The electric-optic conversion section 501 converts the inputted electrical signal into an optical signal and outputs the optical signal to the multimode optical transmission line 503. For the multimode optical transmission line 503, a multimode optical fiber is used. The optical signal propagates in the multimode optical transmission line 503 to the photoelectric conversion section 502. The photoelectric conversion section 502 converts the inputted optical signal into an electrical signal and outputs the electrical signal. In general, a semiconductor laser such as a Fabry-Perot laser is used for the electric-optic conversion section 501. A PIN photodiode, an avalanche photodiode or the like are used for the photoelectric conversion section 502.

In such optical transmission system using the multimode optical fiber, the multimode optical fiber, which has a large core diameter, can be easily connected to a light source, and therefore the system can be constructed at a lower cost than a system using a single mode optical fiber. Because of such advantages, the optical transmission system using the multimode optical fiber is currently in widespread use for systems, such as an office LAN which performs a transmission within a relatively short distance.

However, the optical transmission system using the multimode optical fiber has a plurality of propagation modes in its optical transmission line, so that a transmission characteristic is deteriorated. That is, in the optical transmission system using the multimode optical fiber, some of the propagation modes interfere with each other, which causes a noise called a modal noise. Here, the modal noise refers to a noise occurring due to a temporal change of a speckle pattern caused by the interference between the modes. Further, a bending of the optical fiber or a gap between connectors substantially deteriorates the transmission characteristic.

As described above, when the optical transmission is performed using the multimode optical fiber, the transmission characteristic is deteriorated due to the interference between the modes. Particularly, when the optical transmission line has a small number of modes, or when a light source has a narrow line width, the possibility for the interference between the modes is increased, thereby significantly deteriorating the transmission characteristic. For example, when a surface emitting laser and a 1.3 µm band single mode optical fiber are used as the light source and the optical transmission line, respectively, the interference between the modes is increased, thereby significantly deteriorating the transmission characteristic. A wavelength of the surface emitting laser is typically in a short wavelength region (that is, 850 nm). When the surface emitting laser has such a short wavelength and the single mode optical fiber is used as the optical transmission line to perform optical transmission, the number of modes is reduced to about two or three.

Further, it is assumed that, as the light source connected to the single mode optical fiber, a single mode surface emitting laser having a Gaussian distribution of far field patterns is used. In this case, the optical transmission line has a small number of modes and the light source has a narrow line width, so that the interference between the modes significantly deteriorates the noise characteristic and the distortion characteristic of the multimode optical transmission line.

BRIEF SUMMARY OF THE INVENTION

Therefore, an object of the present invention is to provide a multimode optical transmission apparatus and a multimode optical transmission system capable of reducing, even if an interference between modes exerts a significant influence, a deterioration of a noise characteristic and a distortion characteristic caused by the interference between the modes.

The present invention is directed to a multimode optical transmission apparatus for converting an inputted electrical signal into an optical signal and transmitting the optical signal via a multimode optical transmission line. In order to attain the object mentioned above, the multimode optical transmission apparatus according to the present invention comprises: a signal output section for outputting a predetermined signal in accordance with the inputted electrical signal; a control section for causing the signal output section to adjust a frequency component of the predetermined signal; and an electric-optic conversion section for converting the predetermined signal into an optical signal and transmitting the optical signal via the multimode optical transmission line. The control section adjusts the frequency component of the predetermined signal using group delay information of modes which propagate in the multimode optical transmission line.

Preferably, the signal output section includes a modulation section for modulating the inputted electrical signal and outputting the modulated signal as a high frequency modulated signal. The control section adjusts a frequency of the high frequency modulated signal outputted by the modulation section using the group delay information of each of the modes which propagate in the multimode optical transmission line.

Further, the signal output section may include: a modulation section for modulating the inputted electrical signal and outputting the modulated signal as a high frequency modulated signal; a superimposed signal generation section for generating a signal having a predetermined frequency and outputting the generated signal as a superimposed signal; and a multiplexer section for frequency-multiplexing, with the superimposed signal, the high frequency modulated signal outputted by the modulation section, and outputting the frequency-multiplexed signal as the predetermined signal. The control section adjusts a frequency of the superimposed signal outputted by the superimposed signal generation section using the group delay information of each of the modes which propagate in the multimode optical transmission line.

Preferably, the inputted electrical signal is a baseband signal. In this case, the signal output section includes: a superimposed signal generation section for generating a signal having a predetermined frequency and outputting the generated signal as a superimposed signal; and a multiplexer section for frequency-multiplexing the baseband signal with the superimposed signal and outputting the frequency-multiplexed signal as the predetermined signal. The control section adjusts a frequency of the superimposed signal outputted by the superimposed signal generation section using the group delay information of each of the modes which propagate in the multimode optical transmission line.

Preferably, the control section adjusts the frequency of the superimposed signal outputted by the superimposed signal generation section so that a harmonic component of the superimposed signal does not overlap with a band of the high frequency modulated signal outputted by the modulation section.

Preferably, the multimode optical transmission apparatus further comprises a mode group delay information estimation section for estimating the group delay information of each of the modes which propagate in the multimode optical transmission line. The mode group delay information estimation section includes: a short pulse signal generation section for generating a short pulse signal; a photoelectric conversion section for converting, into an electrical signal, an optical signal received via the multimode optical transmission line; and a comparison calculation section for comparing the short pulse signal generated by the short pulse signal generation section with the electrical signal into which the photoelectric conversion section has converted the optical signal, and calculating the group delay information of each of the modes which propagate in the multimode optical transmission line. The electric-optic conversion section converts, into an optical signal, the short pulse signal generated by the short pulse signal generation section, and transmits the optical signal via the multimode optical transmission line. The optical signal received via the multimode optical transmission line contains the short pulse signal generated by the short pulse signal generation section.

An optical signal received via the multimode optical transmission line may contain the predetermined signal outputted by the signal output section. Preferably, in this case, the multimode optical transmission apparatus further comprises a mode group delay information estimation section for estimating the group delay information of each of the modes which propagate in the multimode optical transmission line. The mode group delay information estimation section includes: a photoelectric conversion section for converting, into an electrical signal, the optical signal received via the multimode optical transmission line, and outputting the electrical signal as the predetermined signal; and a comparison calculation section for comparing the predetermined signal outputted by the signal output section with the predetermined signal outputted by the photoelectric conversion section, calculating an amount of one of a distortion and a noise which are generated in the multimode optical transmission line, and estimating the group delay information of each of the modes which propagate in the multimode optical transmission line using the calculated amount of one of the distortion and the noise.

The control section may calculate the group delay information of each of the modes which propagate in the multimode optical transmission line using a length of the multimode optical transmission line.

Preferably, the control section adjusts the frequency component included in the predetermined signal using a group delay difference $\Delta\tau$ between predominant modes which propagate in the multimode optical transmission line.

$\Delta\tau$ represents a group delay difference between a first mode and a second mode, each of which propagates in the multimode optical transmission line, and n is an arbitrary natural number. Preferably, the modulation section sets a frequency of the high frequency modulated signal to a frequency obtained as $n \times 1/\Delta\tau$.

$\tau$ represents a group delay difference between a first mode and a second mode each of which propagates in the multimode optical transmission line, and n is an arbitrary natural number. Preferably, the modulation section sets a frequency of the high frequency modulated signal to a frequency which is greater than $(n-\frac{1}{4}) \times 1/\Delta\tau$ and smaller than $(n+\frac{1}{4}) \times 1/\Delta\tau$.

$\Delta\tau$ represents a group delay difference between a first mode and a second mode, each of which propagates in the multimode optical transmission line, and n is an arbitrary natural number. Preferably, the superimposed signal generation section sets the frequency of the superimposed signal to a frequency obtained as $(n-\frac{1}{2}) \times 1/\Delta\tau$.

$\Delta\tau$ represents a group delay difference between a first mode and a second mode, each of which propagates in the multimode optical transmission line, and n is an arbitrary natural number. Preferably, the superimposed signal generation section sets the frequency of the superimposed signal to a frequency which is different from a frequency obtained as $n \times 1/\Delta\tau$.

Further, the present invention is directed to a multimode optical transmission system comprising an optical transmitter for converting an inputted electrical signal into an optical signal and transmitting the optical signal via a multimode optical transmission line and an optical receiver for receiving the optical signal via the multimode optical transmission line. In order to attain the object mentioned above, the multimode optical transmission system according to the present invention comprises the optical transmitter and the optical receiver which have the following configurations. The optical transmitter includes: a signal output section for outputting a predetermined signal in accordance with the inputted electrical signal; a control section for causing the signal output section to adjust a frequency component of the predetermined signal; and an electric-optic conversion section for converting the predetermined signal into an optical signal and transmitting the optical signal via the multimode optical transmission line. The control section adjusts the frequency component of the predetermined signal using group delay information of modes which propagate in the multimode optical transmission line. The optical receiver includes a photoelectric conversion section for converting, into the electrical signal, the optical signal received via the multimode optical transmission line.

Further, the process performed by each of the signal output section, the control section and the electric-optic conversion section of the aforementioned multimode optical transmission apparatus may be realized by executing a multimode optical transmission method for converting an inputted electrical signal into an optical signal and transmitting the optical signal via a multimode optical transmission line.

As described above, according to the present invention, the frequency of the high frequency modulated signal with which the optical signal is modulated is set to an appropriate value based on the group delay information of each mode which propagates in the multimode optical transmission line, thereby reducing the deterioration of the noise characteristic and the distortion characteristic caused by the interference between the modes. Thus, even when a multimode optical fiber is used as the optical transmission line, the deterioration of an optical transmission quality can be prevented, and the optical transmission system of a high quality can be provided at a low cost.

Further, the frequency of the superimposed signal with which the optical signal is modulated is set to an appropriate value based on the group delay information of each mode which propagates in the multimode optical transmission line, thereby reducing the deterioration of the noise characteristic and the distortion characteristic caused by the interference between the modes. Moreover, the high frequency modulated signal is frequency-multiplexed with the superimposed signal, thereby widening the line width of the light source. Therefore, the deterioration of the noise characteristic and the distortion characteristic caused by the interference between the modes can be increasingly reduced.

By providing the mode group delay information estimation section, the group delay information of each mode which propagates in the multi mode optical transmission line can be estimated. Thus, even when a network configuration is changed, the deterioration of the noise characteristic and the distortion characteristic caused by the interference between the modes can be reduced. Moreover, the mode group delay information estimation section can accurately estimate, by using the short pulse signal, the group delay information of each mode which propagates in the multimode optical transmission line.

These and other objects, features, aspects and advantages of the present invention will become more apparent from the following detailed description of the present invention when taken in conjunction with the accompanying drawings.

DETAILED DESCRIPTION OF THE INVENTION

Hereinafter, embodiments of the present invention will be described with reference to the drawings.

First Embodiment

Figure 1:
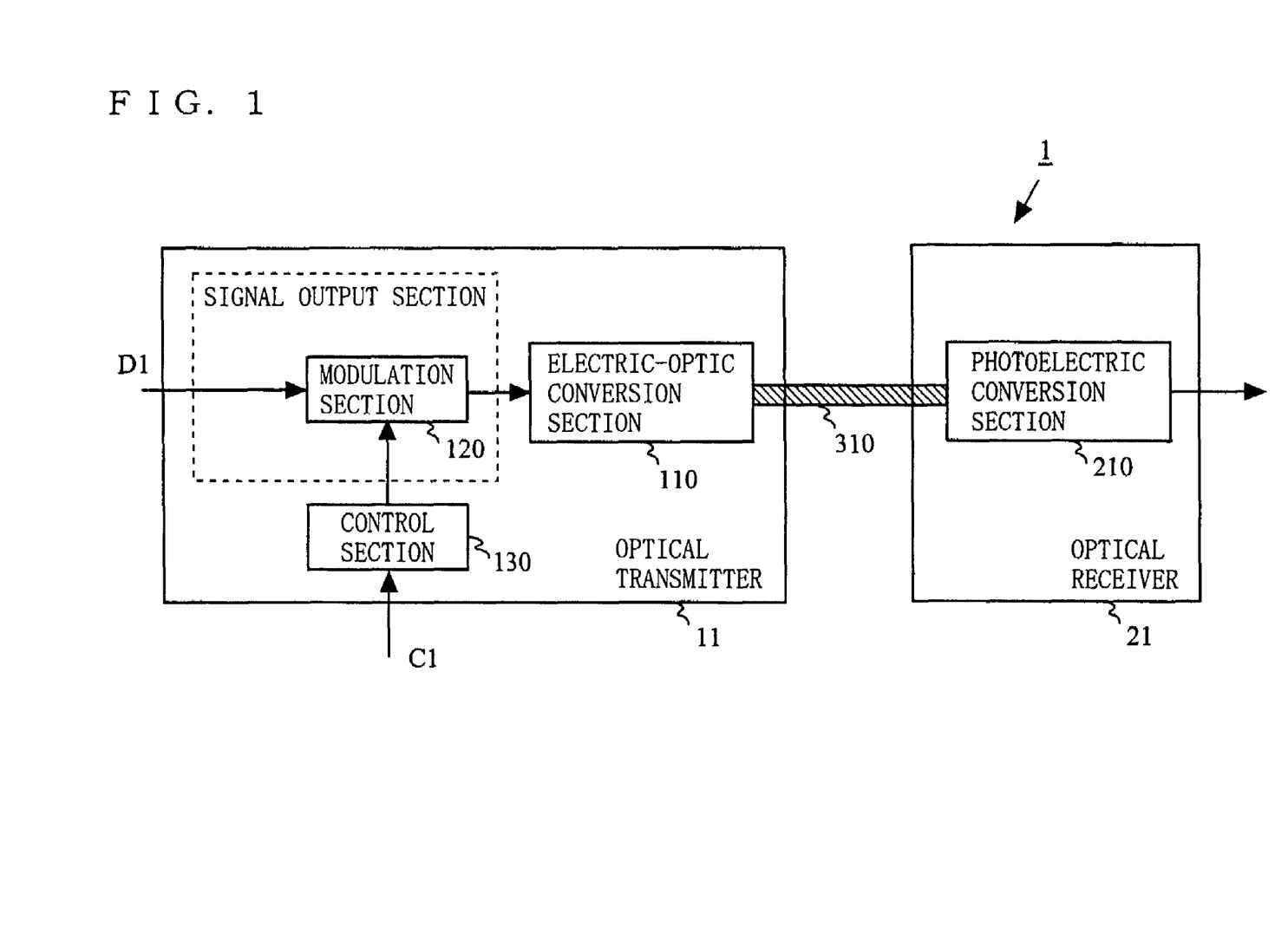
FIG. 1 is a block diagram illustrating an exemplary structure of a multimode optical transmission system 1 according to a first embodiment of the present invention.

FIG. 1 is a block diagram illustrating an exemplary structure of a multimode optical transmission system 1 according to a first embodiment of the present invention. As shown in FIG. 1, the multimode optical transmission system 1 comprises an optical transmitter 11 and an optical receiver 21, which are connected to each other via a multimode optical transmission line 310. The optical transmitter 11 includes an electric-optic conversion section 110, a modulation section 120, and a control section 130. The optical receiver 21 includes a photoelectric conversion section 210.

As shown in FIG. 1, data D1 is inputted to the optical transmitter 11 as data to be transmitted. The modulation section 120 modulates the data D1 and outputs the modulated data as a high frequency modulated signal. The electric-optic conversion section 110 coverts, into an optical signal, the high frequency modulated signal outputted by the modulation section 120, and outputs the optical signal to the multimode optical transmission line 310. The optical signal is inputted to the optical receiver 21 via the multimode optical transmission line 310. The photoelectric conversion section 210 converts, into an electrical signal, the optical signal inputted to the optical receiver 21, and outputs the electrical signal as a high frequency modulated signal.

The multimode optical transmission system 1 has a problem that the aforementioned interference between modes occurs in the multimode optical transmission line 310. That is, the interference between the optical signals (modes) in different propagation paths deteriorates a noise characteristic and a distortion characteristic of the high frequency modulated signal outputted by the photoelectric conversion section 210. However, an appropriate setting of a frequency of the high frequency modulated signal with which the optical signal is modulated can reduce the deterioration of the noise characteristic and the distortion characteristic caused by the interference between the modes.

Therefore, the control section 130 determines the frequency of the high frequency modulated signal outputted by the modulation section 120, based on group delay information C1 of each mode which propagates in the multimode optical transmission line 310. Specifically, the control section 130 determines the frequency of the high frequency modulated signal outputted by the modulation section 120, based on a group delay difference $\Delta\tau$ between predominant modes which propagate in the multimode optical transmission line 310. In the following description, the predominant modes are a reference mode and a first-order mode.

The modulation section 120, which outputs a signal to the electric-optic conversion section 110, may be also referred to as a signal output section. As the multimode optical transmission line 310, a multimode optical fiber cable is typically used. However, a single mode optical fiber cable can be used depending on a usage condition.

Hereinafter, the frequency of the high frequency modulated signal at which the deterioration of the noise characteristic and the distortion characteristic can be reduced will be described with reference to equations and the drawings. Using equation 1, a third-order distortion component $I_{IM3}$ (angular frequency $2\omega_1-\omega_2$) is calculated, the distortion component is generated due to two modes (the reference mode and the first-order mode) of different propagation paths interfering with each other when the optical signal is directly modulated with the modulated signals (angular frequencies $\omega_1$ and $\omega_2$) of two waves and is transmitted using the multimode optical transmission line 310.

$$I_{IM3} \cong \sum_{i,j} 2 \cdot a_i \cdot a_j \cdot J_0(B_1)^2 \cdot J_0(B_2)^2 \cdot X \quad \text{equation 1}$$

$$X = \sqrt{\frac{(p_0^2 + p_1^2 + 2p_0 p_1 \cos((i \cdot \Delta \tau) \cdot \Delta \tau))}{(p_0^2 + p_1^2 + 2p_0 p_1 \cos(j \cdot \Delta \tau))}}$$

$$(i, j) = \{(2\omega_1 - \omega_2, 0), (2\omega_1, \omega_2)\}$$

Figure 2:
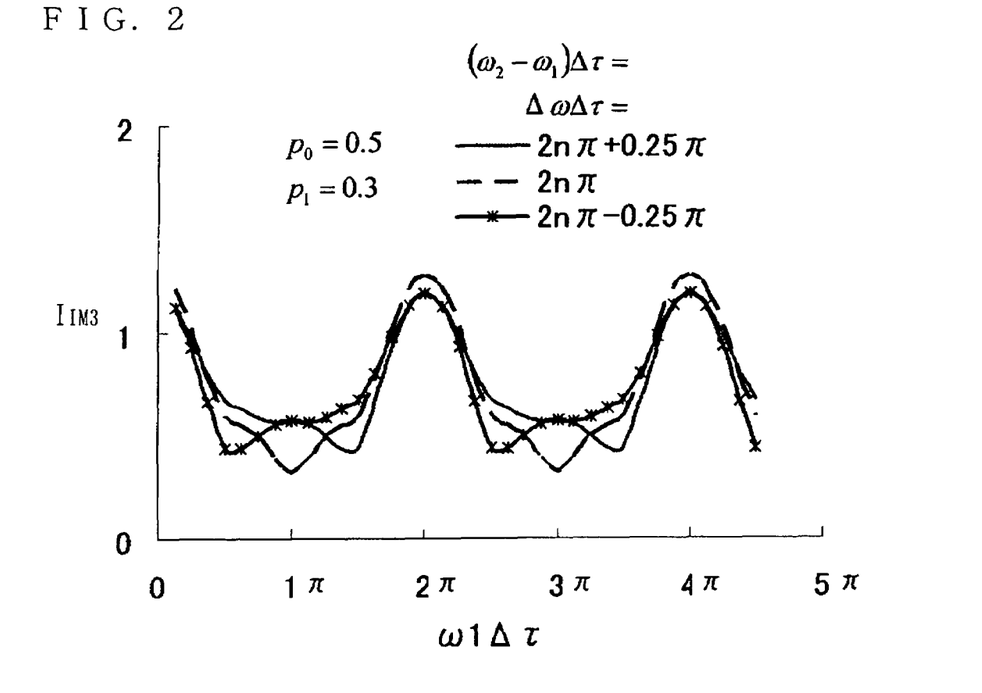
FIG. 2 is a diagram illustrating a dependency, on a frequency of a modulated signal, of a third-order distortion generated by the interference between modes.
Figure 3:
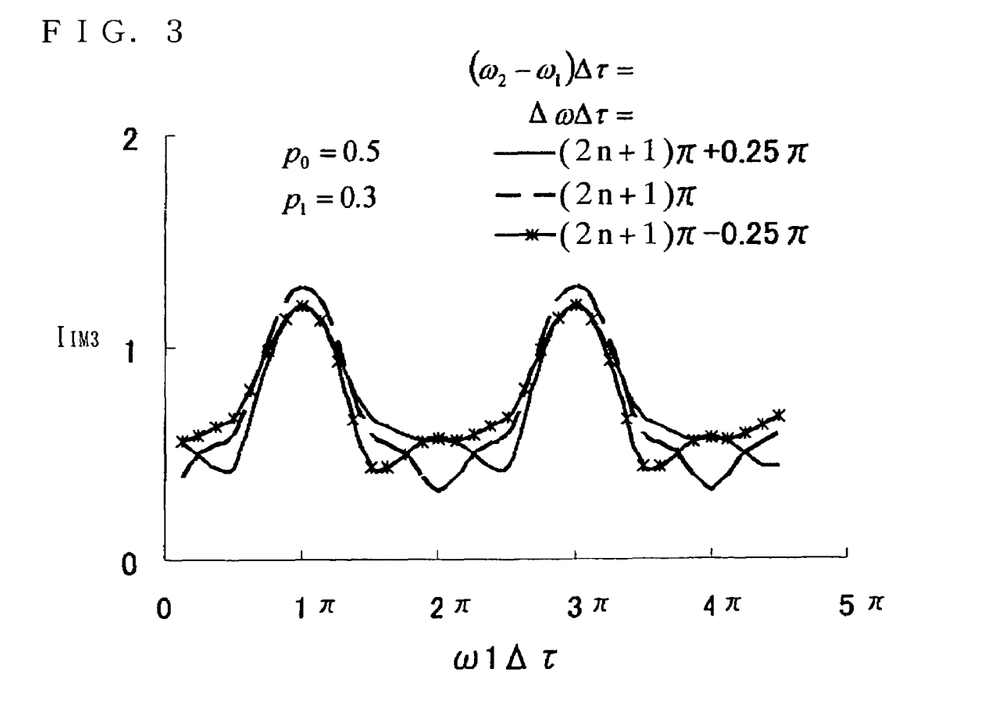
FIG. 3 is a diagram illustrating a dependency, on a frequency of a modulated signal, of a third-order distortion generated by the interference between modes.

$a_i$: amplitude modulation component obtained when angular frequency is $i$ $B_1$: FM modulation index obtained when angular frequency is $\omega_1$ $B_2$: FM modulation index obtained when angular frequency is $\omega_2$ $p_0$: ratio of transmission power of reference mode to power of all modes $p_1$: ratio of transmission power of first-order mode to power of all modes $\Delta \tau$: group delay difference between reference mode and first-order mode In equation 1, the term in the square root varies depending on the angular frequencies $\omega_1$ and $\omega_2$ and the group delay difference $\Delta \tau$, and therefore an amount of the third-order distortion depends on the frequency of the modulated signal and the group delay difference $\Delta \tau$. FIGS. 2 and 3 are diagrams each illustrating a dependency, on the frequency of the modulated signal, of the third-order distortion caused by the interference between the modes. In each of FIGS. 2 and 3, an axis of ordinates represents a result (that is, the third-order distortion $I_{IM3}$) obtained from the calculation using equation 1, and an axis of abscissas represents a product ($\omega_1 \Delta \tau$) of the angular frequency $\omega_1$ and the group delay difference $\Delta \tau$. $\omega_2$ represents an angular frequency offset from $\omega_1$ by $\Delta \omega$. FIGS. 2 and 3 each shows the calculation results against various values of $\Delta \omega \Delta \tau$. As shown in FIG. 2, when $\Delta \omega$ satisfies equation 2, the third-order distortion $I_{IM3}$ is reduced within a range in which $\omega_1$ satisfies equation 3. As shown in FIG. 3, when $\Delta \omega$ satisfies equation 4, the third-order distortion $I_{IM3}$ is reduced within a range in which co, satisfies equation 5. Accordingly, when a value of the group delay difference $\Delta \tau$ is known, the angular frequency $\omega_1$ and the offset $\Delta \omega$ between the modulated signals of the two waves are set so as to satisfy both equation 2 and equation 3 or both equation 4 and equation 5, thereby minimizing the third-order distortion.

$$\frac{\left(2n\pi - \frac{1}{4}\pi\right)}{\Delta \tau} \leq \Delta \omega \leq \frac{\left(2n\pi + \frac{1}{4}\pi\right)}{\Delta \tau} \quad \text{equation 2}$$

where $n = 0, 1, 2, \ldots$ $$\frac{\left((2n+1)\pi - \frac{1}{2}\pi\right)}{\Delta \tau} \leq \omega_1 \leq \frac{\left((2n+1)\pi + \frac{1}{2}\pi\right)}{\Delta \tau} \quad \text{equation 3}$$

where $n = 0, 1, 2, \ldots$ $$\frac{\left((2n+1)\pi - \frac{1}{4}\pi\right)}{\Delta \tau} \leq \Delta \omega \leq \frac{\left((2n+1)\pi + \frac{1}{4}\pi\right)}{\Delta \tau} \quad \text{equation 4}$$

where $n = 0, 1, 2, \ldots$ $$\frac{\left(2n\pi - \frac{1}{2}\pi\right)}{\Delta \tau} \leq \omega_1 \leq \frac{\left(2n\pi + \frac{1}{2}\pi\right)}{\Delta \tau} \quad \text{equation 5}$$

where $n = 0, 1, 2, \ldots$

In equation 2 to equation 5, it is found that, when n=0 is satisfied, an effect of improving the transmission performance is maximized. This is because the lower frequency the optical signal is modulated, the greater the FM modulation indexes $B_1$ and $B_2$ are in equation 1, thereby resulting in $J_0(B_1)$ and $J_0(B_2)$ being reduced in equation 1. Further, when a desired transmission frequency band is determined, n is set to an optimal value such that a transmitted signal is within the desired transmission frequency band, whereby it is possible to enhance the effect of improving the transmission performance within the desired frequency band.

Figure 4:
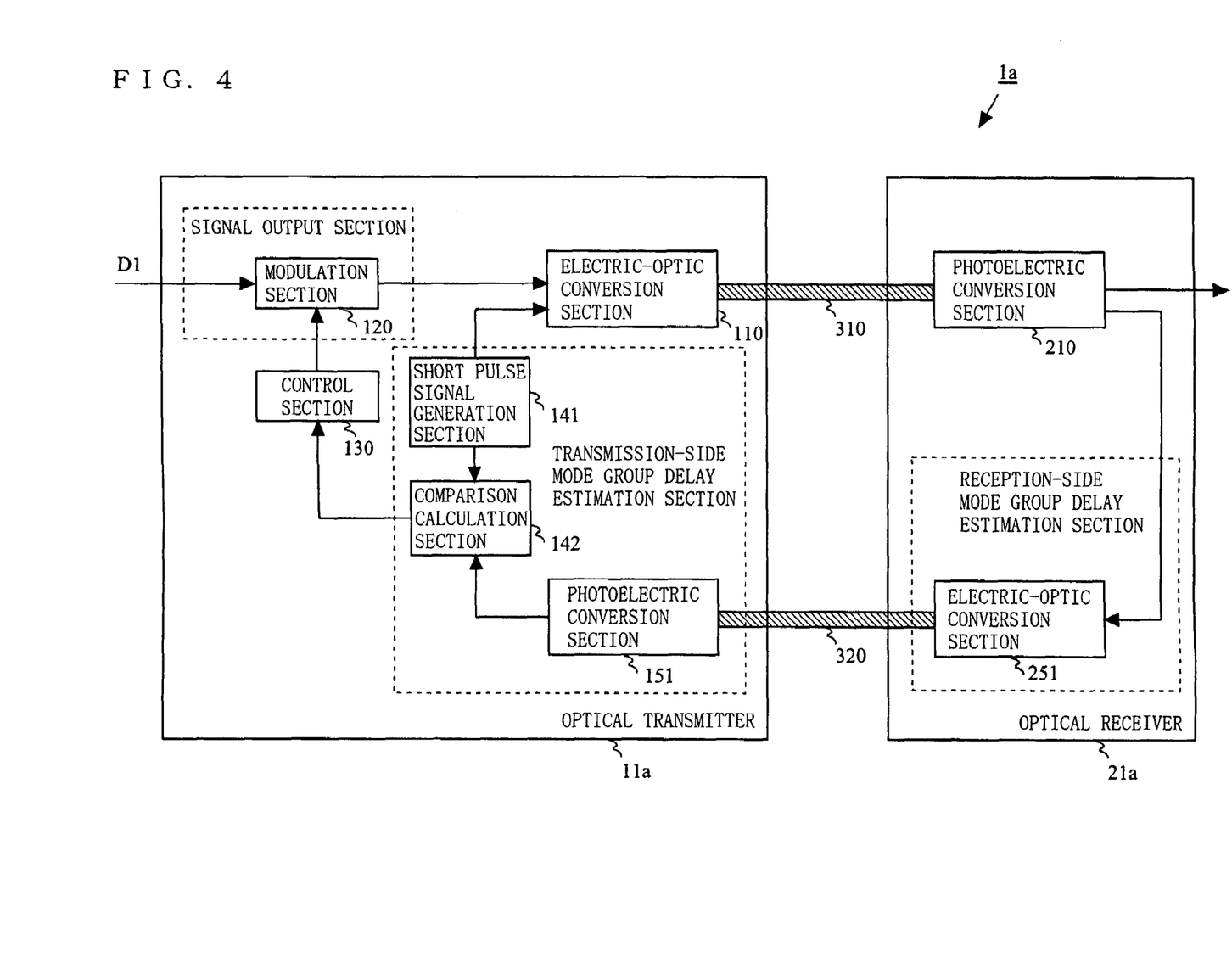
FIG. 4 is a block diagram illustrating an exemplary structure of a multimode optical transmission system 1a for calculating a group delay difference $\Delta\tau$.

Here, a method for calculating the group delay difference $\Delta \tau$ will be described with reference to FIG. 4. FIG. 4 is a block diagram illustrating an exemplary structure of a multimode optical transmission system 1*a* for calculating the group delay difference $\Delta \tau$. As shown in FIG. 4, in the multimode optical transmission system 1*a* for calculating the group delay difference $\Delta \tau$, an optical transmitter 11*a* and an optical receiver 21*a* include a transmission-side mode group delay estimation section and a reception-side mode group delay estimation section, respectively. Further, the transmission-side mode group delay estimation section and the reception-side mode group delay estimation section are connected to each other via a multimode optical transmission line 320. The transmission-side mode group delay estimation section includes a short pulse signal generation section 141, a comparison calculation section 142, and a photoelectric conversion section 151. The reception-side mode group delay estimation section includes an electric-optic conversion section 251.

The multimode optical transmission system 1*a* may be configured such that the transmission-side mode group delay estimation section is provided outside the optical transmitter 11*a* and the reception-side mode group delay estimation section is provided outside the optical receiver 21*a*.

In the transmission-side mode group delay estimation section, the short pulse signal generation section 141 generates a short pulse signal. The electric-optic conversion section 110 converts, into an optical signal, the short pulse signal generated by the short pulse signal generation section 141 and outputs the optical signal to the multimode optical transmission line 310. The optical receiver 21*a* receives the optical signal which propagates in the multimode optical transmission line 310. The photoelectric conversion section 210 converts, into a short pulse signal, the optical signal received by the optical receiver 21*a*. The short pulse signal is inputted to the reception-side mode group delay estimation section. In the reception-side mode group delay estimation section, the electric-optic conversion section 251 converts the short pulse signal into an optical signal again, and outputs the optical signal to the multimode optical transmission line 320.

In the transmission-side mode group delay estimation section, the photoelectric conversion section 151 converts, into a short pulse signal, the optical signal which propagates in the multimode optical transmission line 320. The comparison calculation section 142 compares the short pulse signal obtained through the conversion by the photoelectric conversion section 151 with the short pulse signal generated by the short pulse signal generation section 141 so as to calculate the wavelength of the short pulse signal obtained through the conversion by the photoelectric conversion section 151. The comparison calculation section 142 calculates, based on the wavelength having been calculated, the group delay difference $\Delta\tau$ between the reference mode and the first-order mode, which is generated in the multimode optical transmission line 310 and the multimode optical transmission line 320.

In the multimode optical transmission system 1a, the multimode optical transmission line 310 and the multimode optical transmission line 320 may share a common multimode optical transmission line. Even when the common multimode optical transmission line is used, the short pulse signal is not transmitted from the optical transmitter 11a to the optical receiver 21a while the short pulse signal is being transmitted from the optical receiver 21a to the optical transmitter 11a, and therefore no collision occurs between the short pulse signals. Therefore, the transmission-side mode group delay estimation section can calculate the group delay difference $\Delta\tau$ between the reference mode and the first-order mode with enhanced accuracy.

As described above, the multimode optical transmission system according to the first embodiment of the present invention appropriately sets the frequency of the high frequency modulated signal with which the optical signal is modulated, based on the group delay information of each mode which propagates in the multimode optical transmission line 310, thereby ensuring that the deterioration of the noise characteristic and the distortion characteristic caused by the interference between the modes can be reduced. Accordingly, even when the multimode optical fiber is used as the optical transmission line, it is possible to prevent a deterioration of a quality of the optical transmission, thereby providing the optical transmission system of high quality at a low cost.

Further, by providing the mode group delay estimation sections, the group delay information of each mode which propagates in the multimode optical transmission line 310 can be estimated. Therefore, even when the network configuration is changed, it is possible to reduce the deterioration of the noise characteristic and the distortion characteristic caused by the interference between the modes. Further, by using the short pulse signal, the mode group delay estimation sections can accurately estimate the group delay information of each mode which propagates in the multimode optical transmission line 310.

Moreover, the multimode optical transmission system may estimate the group delay information of each mode which propagates in the multimode optical transmission line 310, based on a length of the multimode optical transmission line 310 without using the transmission-side mode group delay estimation section and the reception-side mode group delay estimation section, thereby simplifying the process. In this case, the multimode optical transmission system can estimate the mode group delay information without using the complicated configuration.

Furthermore, while in the above description the third-order distortion caused by the interference between two modes of the different propagation paths is reduced, the multimode optical transmission system 1 of the present embodiment is also useful for reducing other types of distortions (for example, a second-order distortion and a noise). In other words, when the multimode optical transmission system 1 sets the frequency of the high frequency modulated signal so as to satisfy both equation 2 and equation 3 or both equation 4 and equation 5, characteristic deteriorations other than the third-order distortion can be reduced. Further, even when the number of modes is plural, the multimode optical transmission system 1 of the present embodiment can obtain the same effect as described above.

Moreover, when an amplitude of the high frequency modulated signal is increased, the FM modulation indexes $B_1$ and $B_2$ are also increased. Therefore, values of the Bessel functions $J_0(B_1)$ and $J_0(B_2)$ can be reduced. Accordingly, the multimode optical transmission system 1 of the present embodiment sets the frequency of the high frequency modulated signal so as to satisfy both equation 2 and equation 3 or both equation 4 and equation 5, and sets the amplitude of the high frequency modulated signal so as to have a great value, thereby ensuring that the deterioration of the noise characteristic and the distortion characteristic caused by the interference between the modes can be effectively reduced.

Second Embodiment

In the first embodiment, the method for determining the frequency of the high frequency modulated signal based on the group delay difference $\Delta\tau$ between the reference mode and the first-order mode is described. In a second embodiment, when a superimposed signal is frequency-multiplexed with the high frequency modulated signal, the frequency of the superimposed signal is set to an optimal value so as to reduce the deterioration of the noise characteristic and the distortion characteristic caused by the interference between the modes.

Figure 5:
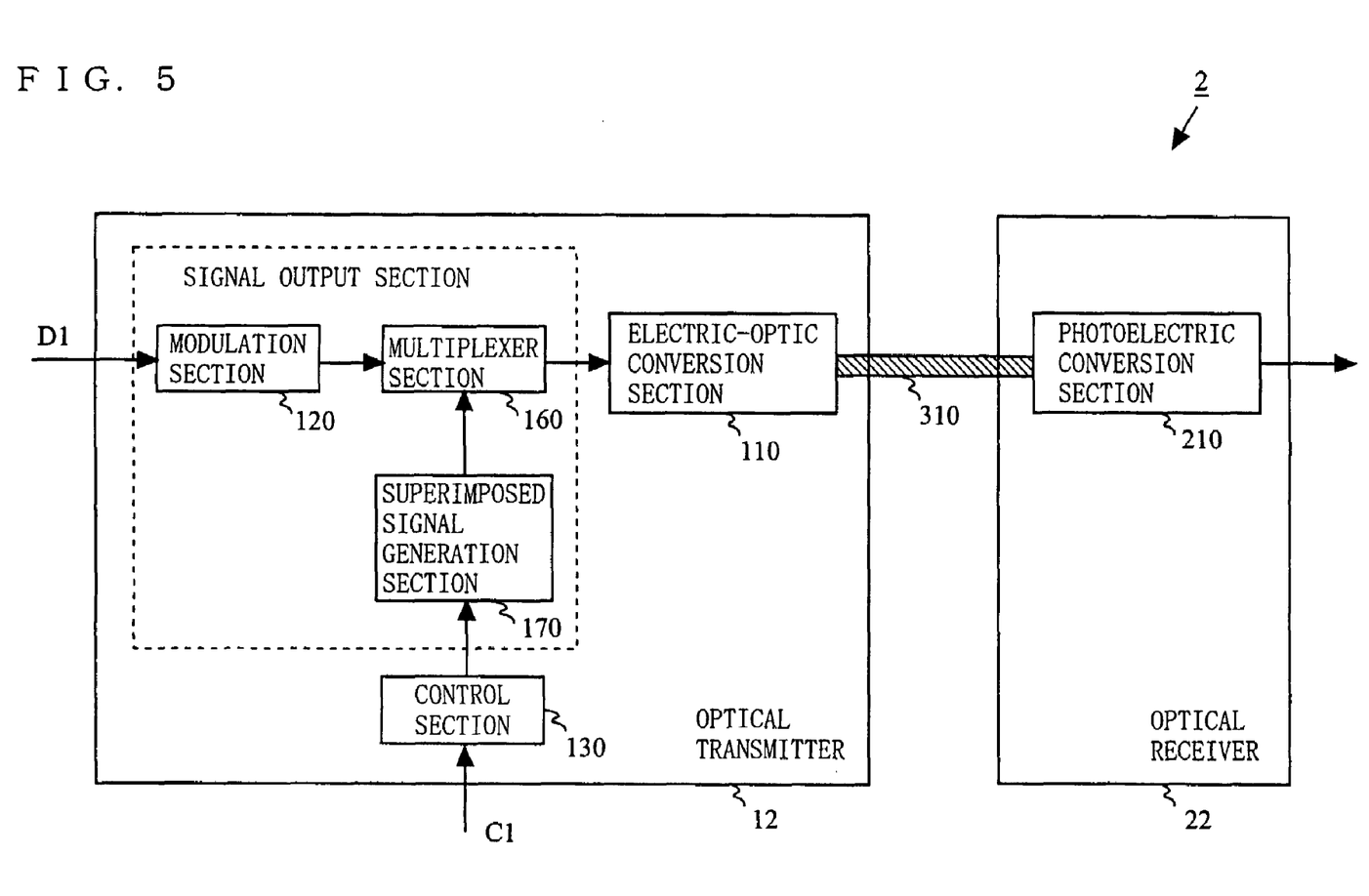
FIG. 5 is a block diagram illustrating an exemplary structure of a multimode optical transmission system 2 according to a second embodiment of the present invention.

FIG. 5 is a block diagram illustrating an exemplary structure of a multimode optical transmission system 2 according to the second embodiment of the present invention. As shown in FIG. 5, the multimode optical transmission system 2 comprises an optical transmitter 12 and an optical receiver 22, which are connected to each other via a multimode optical transmission line 310. The optical transmitter 12 includes an electric-optic conversion section 110, a modulation section 120, a control section 130, a multiplexer section 160 and a superimposed signal generation section 170. The optical receiver 22 includes a photoelectric conversion section 210.

In the optical transmitter 12, the control section 130 determines a frequency of the superimposed signal generated by the superimposed signal generation section 170, based on the group delay difference $\Delta\tau$ between the reference mode and the first-order mode, each of which propagates in the multimode optical transmission line 310. The superimpose signal generation section 170 generates the superimposed signal having a certain frequency. The modulation section 120 modulates the data D1 and outputs the modulated data as the high frequency modulated signal. The multiplexer section 160 frequency-multiplexes the superimposed signal generated by the superimposed signal generation section 170 with the high frequency modulated signal outputted by the modulation section 120, and outputs the frequency-multiplexed signal as the high frequency modulated signal. The electric-optic conversion section 110 converts, into an optical signal, the high frequency modulated signal outputted by the multiplexer section 160, and outputs the optical signal to the multimode optical transmission line 310. The photoelectric conversion section 210 converts, into a high frequency modulated signal, the optical signal inputted to the optical receiver 22 via the multimode optical transmission line 310.

The modulation section 120 may output, instead of the high frequency modulated signal, a signal obtained through a modulation with a baseband signal. Further, the modulation section 120, the multiplexer section 160, and the superimposed signal generation section 170, which are configured so as to output a signal to the electric-optic conversion section 110, may be collectively referred to as a signal output section.

The multimode optical transmission system 2 appropriately sets the frequency of the superimposed signal which is frequency-multiplexed with the high frequency modulated signal so as to ensure that the deterioration of the noise characteristic and the distortion characteristic caused by the interference between the modes can be reduced. Hereinafter, the frequency of the superimposed signal at which the deterioration of the noise characteristic and the distortion characteristic can be reduced will be described with reference to equations and the drawings.

Using equation 6, a third-order distortion component $I_{IM3}$ (angular frequency $2\omega_1 - \omega_2$) is calculated, the distortion component is generated due to two modes (the reference mode and the first-order mode) of different propagation paths interfering with each other when the optical signal is directly modulated with the modulated signals (angular frequencies $\omega_1$ and $\omega_2$) of two waves and the superimposed signal (angular frequency $\omega_{LO}$) of one wave and is transmitted using the multimode optical transmission line 310.

$$I_{IM3} \cong \sum_{i,j} 2 \cdot a_i \cdot a_j \cdot J_0(B_1)^2 \cdot J_0(B_2)^2 \cdot J_0(B_{LO})^2 \cdot X + \quad \text{equation 6}$$

$$\sum_{i,j} 2 \cdot a_i \cdot a_j \cdot J_0(B_1)^2 \cdot J_0(B_2)^2 \cdot J_1(B_{LO})^2 \cdot Y$$

$$X = \sqrt{\frac{(p_0^2 + p_1^2 + 2p_0 p_1 \cos((i \cdot \Delta\tau) \cdot \Delta\tau))}{(p_0^2 + p_1^2 + 2p_0 p_1 \cos(j \cdot \Delta\tau))}}$$

$$Y = \sqrt{\frac{(p_0^2 + p_1^2 + 2p_0 p_1 \cos((i + \omega_{LO}) \cdot \Delta\tau))}{(p_0^2 + p_1^2 + 2p_0 p_1 \cos((j + \omega_{LO}) \cdot \Delta\tau))}}$$

$$(i, j) = \{(2\omega_1 - \omega_2, 0), (2\omega_1, \omega_2)\}$$

$a_i$: amplitude modulation component obtained when angular frequency is $i$ $B_1$: FM modulation index obtained when angular frequency is $\omega_1$ $B_2$: FM modulation index obtained when angular frequency is $\omega_2$ $B_{LO}$: FM modulation index obtained when angular frequency of superimposed signal is $\omega_{LO}$ $p_0$: ratio of transmission power of reference mode to power of all modes $p_1$: ratio of transmission power of first-order mode to power of all modes $\Delta\tau$: group delay difference between reference mode and first-order mode In equation 6, the second term depends on the frequency of the superimposed signal and the term in the square root of the second term varies depending on a product of the group delay difference $\Delta\tau$ and the angular frequency $\omega_{LO}$ of the superimposed signal, and therefore an amount of the third-order distortion varies depending on the group delay difference $\Delta\tau$ and the angular frequency $\omega_{LO}$ of the superimposed signal.

Figure 6:
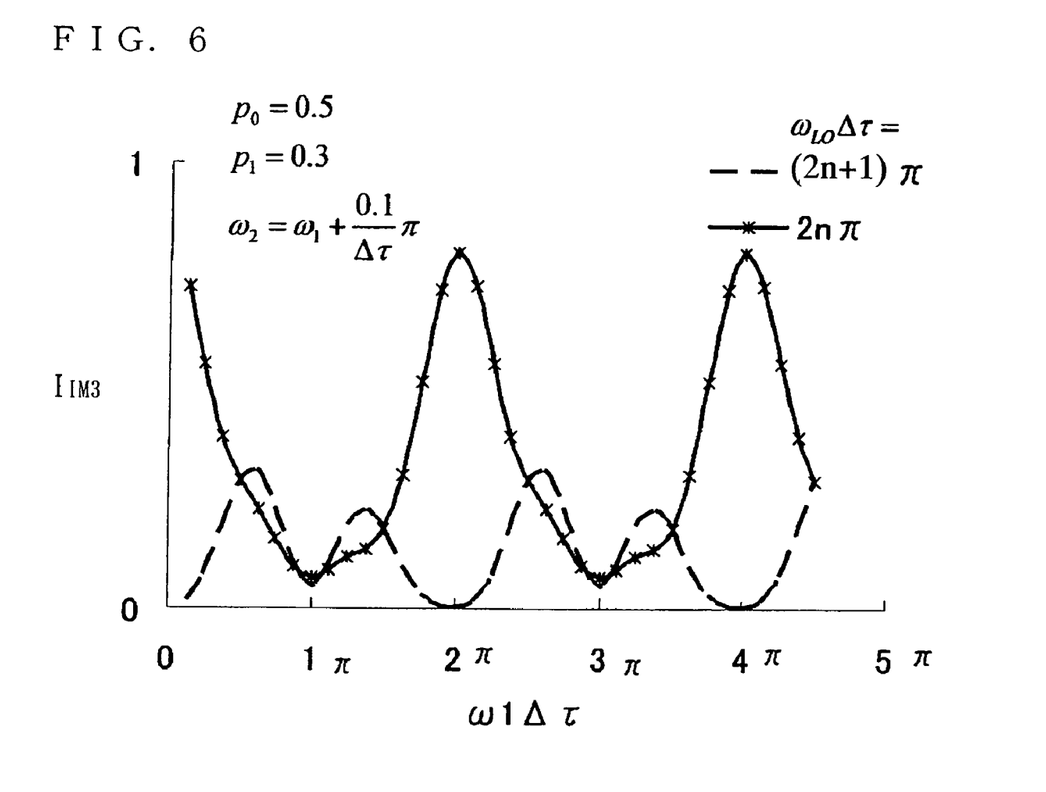
FIG. 6 is a diagram illustrating an effect of reducing, when the superimposed signal is used, the third-order distortion generated by the interference between the modes.

FIG. 6 is a diagram illustrating an effect of reducing, when the superimposed signal is used, the third-order distortion generated by the interference between the modes. In FIG. 6, an axis of ordinates represents a result (that is, the third-order distortion $I_{IM3}$) obtained from the calculation using equation 6, and an axis of abscissas represents a product ($\omega_1 \Delta\tau$) of the group delay difference $\Delta\tau$ and the angular frequency $\omega_1$ of the modulated signal. FIG. 6 shows the calculation result obtained when $\omega_{LO}\Delta\tau$ is equal to $2n\pi$ and the calculation result obtained when $\omega_{LO}\Delta\tau$ is equal to $2(n+1)\pi$ (n is an integer). As shown in FIG. 6, the third-order distortion $I_{IM3}$ obtained when $\omega_{LO}\Delta\tau$ is equal to $2(n+1)\pi$ is smaller than the third-order distortion $I_{IM3}$ obtained when $\omega_{LO}\Delta\tau$ is equal to $2n\pi$. Accordingly, when the angular frequency $\omega_{LO}$ of the superimposed signal is set to such a value so as to satisfy equation 7, the third-order distortion $I_{IM3}$ can be reduced regardless of the frequency of the modulated signal. Further, as shown in FIG. 6, when the frequency of the modulated signal is set to such a value so as to satisfy equation 8, the third-order distortion $I_{IM3}$ can be increasingly reduced.

$$\omega_{LO} = 2\pi \cdot f_{LO} = \left(\frac{2n+1}{\Delta\tau}\right)\pi \quad \text{equation 7}$$

where, $n = 0, 1, 2, \ldots$ $$\omega_1 \Delta\tau = (2n+1)\pi \quad \text{equation 8}$$

where, $n = 0, 1, 2, \ldots$

In the second embodiment, the method for detecting the group delay difference $\Delta\tau$ between the reference mode and the first-order mode is the same as the method described for the first embodiment, and the method is not described in detail. Further, as in the first embodiment, the multimode optical transmission system 2 according to the second embodiment may detect the group delay difference $\Delta\tau$ between the reference mode and the first-order mode, based on the length of the multimode optical transmission line 310, thereby simplifying the process.

Further, in equation 7, it is found that, when n=0 is satisfied, an effect of improving the transmission performance is maximized. This is because the lower frequency at which the optical signal is modulated, the greater the FM modulation index $B_{LO}$ is in equation 6, thereby enabling $J_0(B_{LO})$ to be reduced in equation 6. Further, n is set to an optimal value so as not to include a harmonic component of the superimposed signal in the frequency components of the transmitted signal, whereby it is possible to prevent an influence of the harmonic component of the superimposed signal on the transmitted signal, and reduce the deterioration of the noise characteristic and the distortion characteristic caused by the interfere between the modes.

As described above, the multimode optical transmission system 2 according to the second embodiment of the present invention appropriately sets the frequency of the superimposed signal with which the optical signal is modulated, based on the group delay information of each mode which propagates in the multimode optical transmission line 310, thereby ensuring that the deterioration of the noise characteristic and the distortion characteristic caused by the interference between the modes can be reduced. Further, by frequency-multiplexing the high frequency modulated signal with the superimposed signal, the line width of the light source can be widened, thereby reducing the deterioration of the noise characteristic and the distortion characteristic caused by the interference between the modes.

The modulation section 120 may set the frequency f of the high frequency modulated signal so as to satisfy equation 9 or equation 10. Thus, the multimode optical transmission system 2 can maximize an amplitude of the high frequency modulated signal outputted by the photoelectric conversion section 210, thereby performing the transmission with an improved quality.

$$f = n \times \frac{1}{\Delta\tau} \quad \text{equation 9}$$

$$\left(n - \frac{1}{4}\right) \times \frac{1}{\Delta\tau} < f < \left(n + \frac{1}{4}\right) \times \frac{1}{\Delta\tau} \quad \text{equation 10}$$

Here, n is an arbitrary natural number.

Furthermore, although in the above description the third-order distortion generated by the interference between two modes of the different propagation paths is reduced, the multimode optical transmission system 2 of the present embodiment is also useful for reducing other types of distortions (for example, the second-order distortion and the noise). In other words, when the multimode optical transmission system 2 sets the frequency of the superimposed signal so as to satisfy equation 7, characteristic deteriorations other than the third-order distortion can be reduced. Further, even when the number of modes is plural, the multimode optical transmission system 2 of the present embodiment can obtain the same effect as described above.

In addition, when an amplitude of the superimposed signal is increased, the FM modulation index $B_{LO}$ is increased. Therefore, a value of the Bessel function $J_0(B_{LO})$ can be reduced and a value of the first term can be reduced in equation 6. On the other hand, the greater the value of $B_{LO}$, the greater value the Bessel function $J_1(B_{LO})$ has. Therefore, the value of the second term is increased. However, by determining the frequency of the superimposed signal as described above, the value of the second term can be reduced. Accordingly, the multimode optical transmission system 2 of the present embodiment sets the frequency of the superimposed signal so as to satisfy equation 7 and sets the amplitude of the superimposed signal so as to have a great value, thereby ensuring that the deterioration of the noise characteristic and the distortion characteristic caused by the interference between the modes can be effectively reduced.

Third Embodiment

In order to reduce the deterioration of the noise characteristic and the distortion characteristic caused by the interference between the modes, a method for appropriately setting the frequency of the high frequency modulated signal is used in the first embodiment and a method for appropriately setting the frequency of the superimposed signal which is frequency-multiplexed with the high frequency modulated signal is used in the second embodiment. In a third embodiment, described is a method for calculating the group delay difference $\Delta\tau$ between the reference mode and the first-order mode each propagating in the multimode optical transmission line 310 by utilizing the fact that the change in frequency of the high frequency modulated signal or change in frequency of superimposed signal changes an amount of distortion or an amount of noise.

Figure 7A:
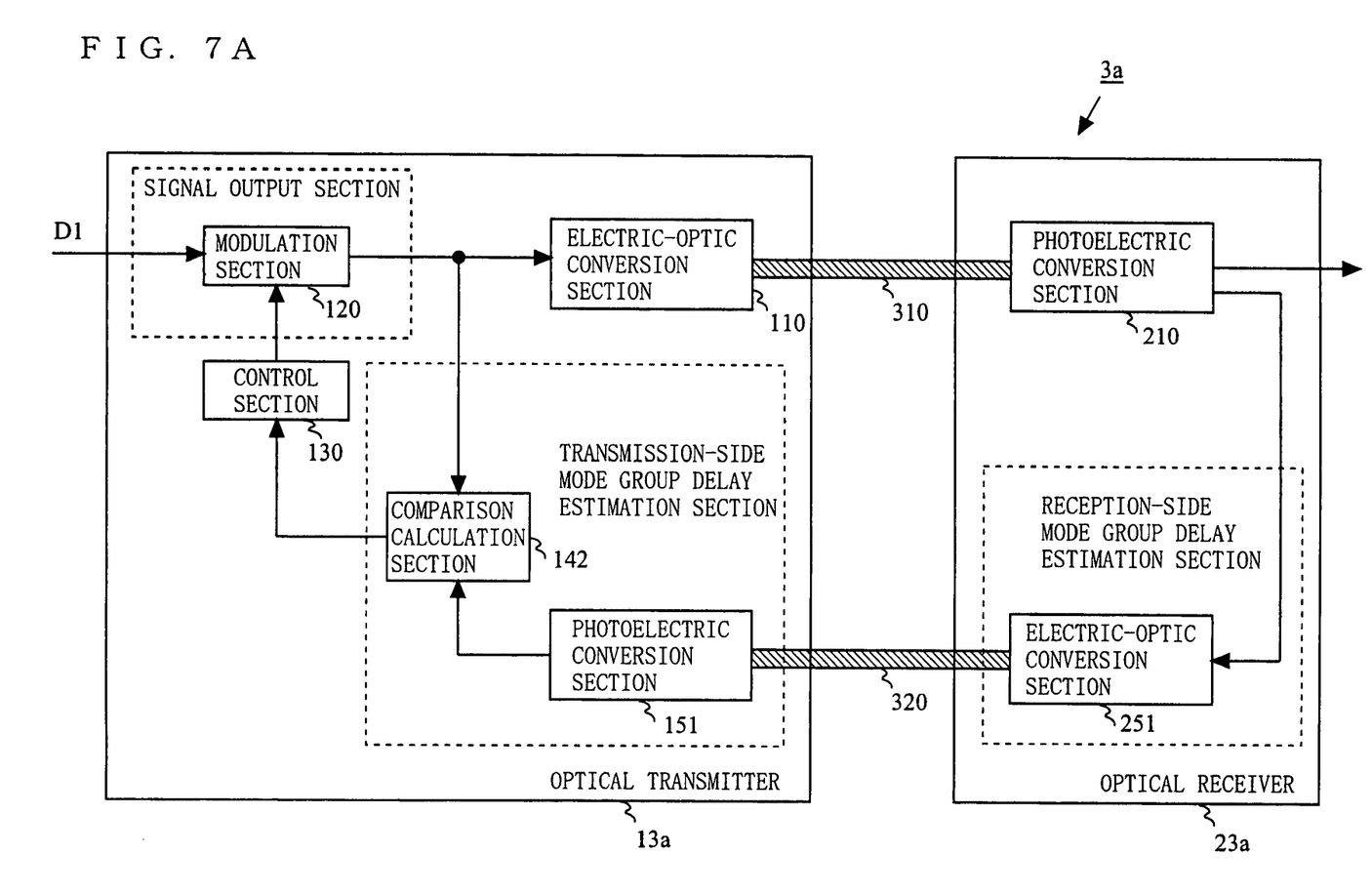
FIG. 7A is a block diagram illustrating an exemplary structure of a multimode optical transmission system 3a according to a third embodiment of the present invention.

FIG. 7A is a block diagram illustrating an exemplary structure of a multimode optical transmission system 3a according to the third embodiment of the present invention. As shown in FIG. 7A, the multimode optical transmission system 3a comprises an optical transmitter 13a and an optical receiver 23a, which are connected to each other via the multimode optical transmission line 310 and the multimode optical transmission line 320. The optical transmitter 13a includes an electric-optic conversion section 110, a modulation section 120, a control section 130, a photoelectric conversion section 151 and a comparison calculation section 181. The optical receiver 23a includes a photoelectric conversion section 210 and an electric-optic conversion section 251.

The modulation section 120, which outputs a signal to the electric-optic conversion section 110, may be also referred to as a signal output section. Further, the photoelectric conversion section 151 and the comparison calculation section 181, which are configured so as to estimate the group delay difference $\Delta\tau$ between the reference mode and the first-order mode at the transmission end, may be collectively referred to as a transmission-side mode group delay estimation section. Further, the electric-optic conversion section 251, which estimates the group delay difference $\Delta\tau$ between the reference mode and the first-order mode at the reception end, may be also referred to as a reception-side mode group delay estimation section.

In the optical transmitter 13a, the modulation section 120 modulates inputted data D1 and outputs the modulated data as a high frequency modulated signal. The electric-optic conversion section 110 converts, into an optical signal, the high frequency modulated signal outputted by the modulation section 120 and outputs the optical signal to the multimode optical transmission line 310. The optical receiver 23a receives the optical signal which propagates in the multimode optical transmission line 310. The photoelectric conversion section 210 converts, into a high frequency modulated signal, the optical signal received by the optical receiver 23a. The high frequency modulated signal is inputted to the reception-side mode group delay estimation section. In the reception-side mode group delay estimation section, the electric-optic conversion section 251 converts the high frequency modulated signal into an optical signal again and outputs the optical signal to the multimode optical transmission line 320.

In the transmission-side mode group delay estimation section, the photoelectric conversion section 151 converts, into a high frequency modulated signal, the optical signal which propagates in the multimode optical transmission line 320. The comparison calculation section 181 compares the high frequency modulated signal outputted by the modulation section 120 with the high frequency modulated signal obtained through the conversion by the photoelectric conversion section 151 so as to calculate an amount of distortion, such as a second-order harmonic distortion and a third-order inter modulation distortion, contained in the high frequency modulated signal obtained through the conversion by the photoelectric conversion section 151. The comparison calculation section 181 calculates, based on the amount of distortion having been calculated, the group delay difference $\Delta\tau$ between the reference mode and the first-order mode each generated in the multimode optical transmission line 310 and the multimode optical transmission line 320.

More specifically, as described for the first embodiment, when an optical signal is directly modulated with modulated signals (angular frequencies $\omega_1$ and $\omega_2$) of two waves and is transmitted using the multimode optical transmission line 310, the third-order distortion generated by the interference between the modes depends on the frequency of the modulates signal. That is, the change in frequency of the high frequency modulated signal changes an amount of the third-order distortion, and therefore the comparison calculation section 180 can calculate the group delay difference $\Delta\tau$ based on the change of the third-order distortion amount in accordance with the frequency of the high frequency modulated signal.

Figure 7B:
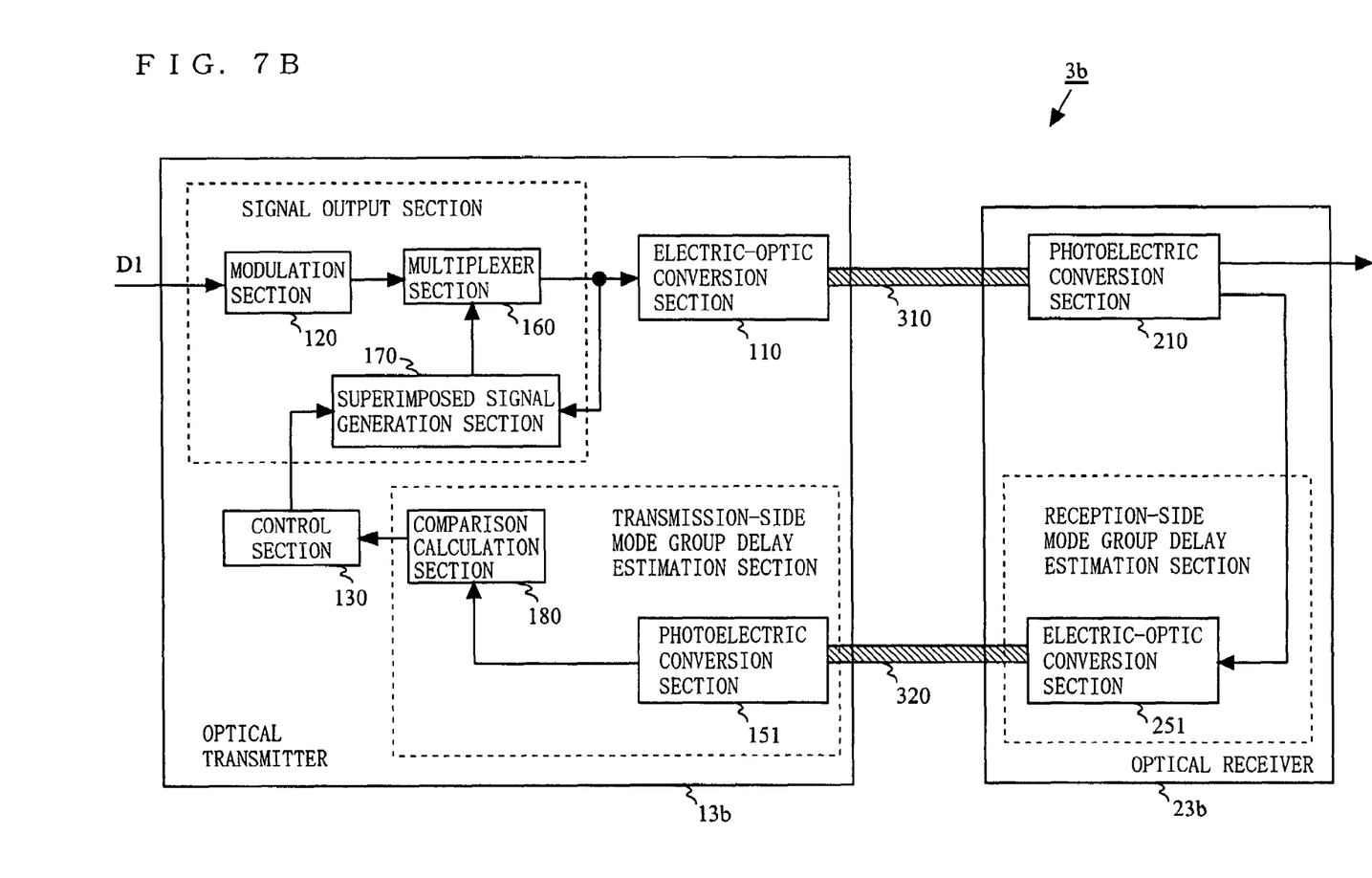
FIG. 7B is a block diagram illustrating an exemplary structure of a multimode optical transmission system 3b according to the third embodiment of the present invention.

FIG. 7B is a block diagram illustrating an exemplary structure of a multimode optical transmission system 3b according to the third embodiment of the present invention. As shown in FIG. 7B, the multimode optical transmission system 3b comprises an optical transmitter 13b and an optical receiver 23b, which are connected to each other via the multimode optical transmission line 310 and the multimode optical transmission line 320. The optical transmitter 13b includes an electric-optic conversion section 110, a modulation section 120, a control section 130, a photoelectric conversion section 151, a multiplexer section 160, a superimposed signal generation section 170 and a comparison calculation section 182. The optical receiver 23b includes a photoelectric conversion section 210 and an electric-optic conversion section 251.

The modulation section 120, the multiplexer section 160, and the superimposed signal generation section 170, which are configured so as to output a signal to the electric-optic conversion section 110, may be collectively referred to as a signal output section. Further, the photoelectric conversion section 151 and the comparison calculation section 182, which are configured so as to estimate the group delay difference $\Delta\tau$ between the reference mode and the first-order mode at the transmission end, may be collectively referred to as a transmission-side mode group delay estimation section. Further, the electric-optic conversion section 251, which estimates the group delay difference $\Delta\tau$ between the reference mode and the first-order mode at the reception end, may be also referred to as a reception-side mode group delay estimation section In the optical transmitter 13b, the modulation section 120 modulates inputted data D1 and outputs the modulated data as a high frequency modulated signal. The superimposed signal generation section 170 generates a superimposed signal having a certain frequency. The multiplexer section 160 frequency-multiplexes the high frequency modulated signal outputted by the modulation section 120 with the superimposed signal generated by the superimposed signal generation section 170, and outputs the frequency-multiplexed signal as a high frequency modulated signal. The electric-optic conversion section 110 converts, into an optical signal, the high frequency modulated signal outputted by the multiplexer section 160 and outputs the optical signal to the multimode optical transmission line 310.

The optical receiver 23b receives the optical signal which propagates in the multimode optical transmission line 310. The photoelectric conversion section 210 converts, into a high frequency modulated signal, the optical signal received by the optical receiver 23b. The high frequency modulated signal is inputted to the reception-side mode group delay estimation section.

In the reception-side mode group delay estimation section, the electric-optic conversion section 251 converts the high frequency modulated signal into an optical signal again and outputs the optical signal to the multimode optical transmission line 320. In the transmission-side mode group delay estimation section, the photoelectric conversion section 151 converts, into a high frequency modulated signal, the optical signal which propagates in the multimode optical transmission line 320. The comparison calculation section 182 compares the high frequency modulated signal outputted by the signal output section with the superimposed signal contained in the high frequency modulated signal obtained through the conversion by the photoelectric conversion section 151 so as to calculate an amount of distortion, such as a second-order harmonic distortion and a third-order intermodulation distortion, contained in the superimposed signal. The comparison calculation section 182 calculates, based on the amount of distortion having been calculated, the group delay difference $\Delta\tau$ between the reference mode and the first-order mode each generated in the multimode optical transmission line 310 and the multimode optical transmission line 320.

Figure 8:
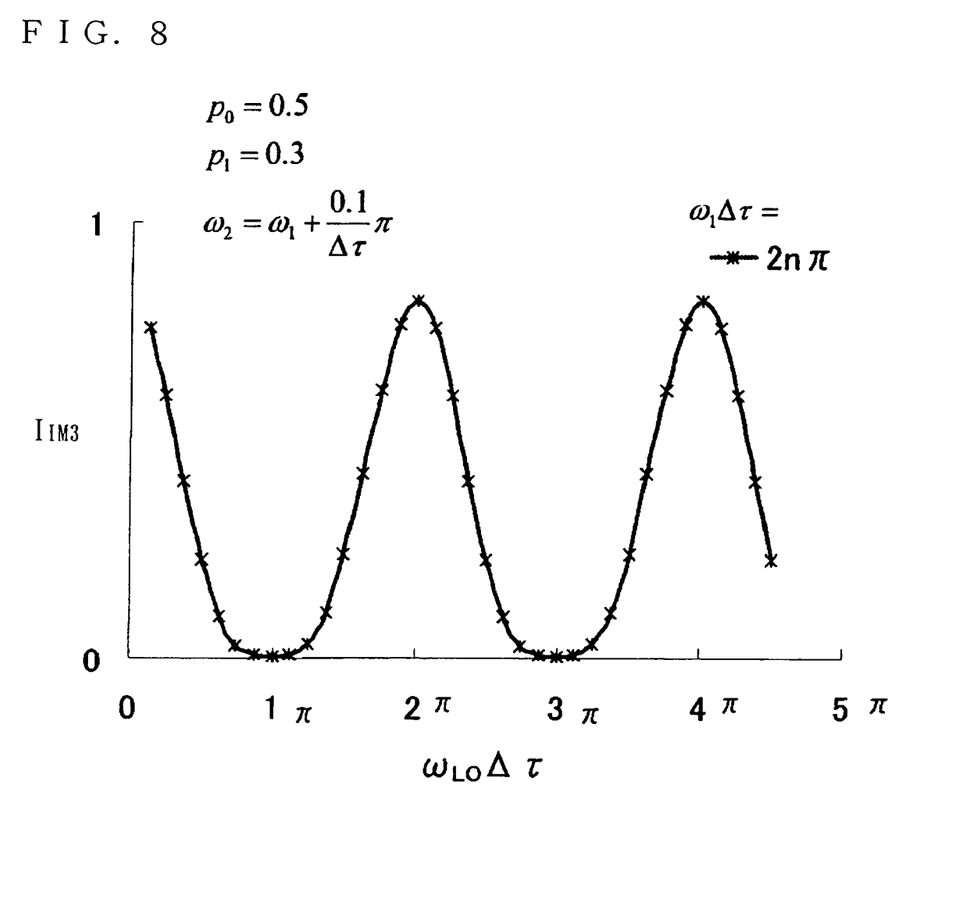
FIG. 8 is a diagram illustrating a dependency, on a frequency of the superimposed signal, of an amount of the third-order distortion generated by the interference between the modes.

More specifically, as described for the second embodiment, when an optical signal is directly modulated with the modulated signals (angular frequencies $\omega_1$ and $\omega_2$) of two waves and the superimposed signal (angular frequency $\omega_{LO}$) of one wave, and is transmitted using the multimode optical transmission line 310, the third-order distortion generated by the interference between the modes depends on the frequency of the superimposed signal. FIG. 8 is a diagram illustrating a dependency, on the frequency of the superimposed signal, of an amount of the third-order distortion generated by the interference between the modes. As shown in FIG. 8, when each of the frequencies of the modulated signals of two waves is set to an appropriate value so as to satisfy $\omega_1\Delta\tau=2n\pi$ and $\omega_2\Delta\tau=\omega_1\Delta\tau+0.1\pi$ (n is an arbitrary integer), the third-order distortion $I_{IM3}$ varies depending on a value of $\omega_{LO}\Delta\tau$. That is, since the third-order distortion amount changes in accordance with the frequency of the superimposed signal, the comparison calculation section 180 can calculate the group delay difference $\Delta\tau$, based on the change of the third-order distortion amount in accordance with the frequency of the superimposed signal.

Although in the above description the group delay difference $\Delta\tau$ between the reference mode and the first-order mode is calculated based on the distortion amount, the group delay difference $\Delta\tau$ can be calculated by monitoring a noise amount. Specifically, the optical transmitter 13b modulates the optical signal with a signal obtained by frequency-multiplexing an unmodulated carrier (hereinafter, referred to as a monitor signal) with the superimposed signal, and transmits the modulated optical signal via the multimode optical transmission line 310. In the case where in the optical transmitter 13b the photoelectric conversion section 151 demodulates the optical signal received via the multimode optical transmission line 320, a noise generated near the monitor signal changes in accordance with the frequency of the superimposed signal. A cycle of the change depends on the group delay information of the modes propagating in the multimode optical transmission line 310, and therefore a relationship between the frequency of the superimposed signal and a level of the noise generated near the monitor signal is obtained, thereby calculating the group delay difference $\Delta\tau$. Even when the optical signal is modulated with only the monitor signal, the group delay difference $\Delta\tau$ can be calculated. That is, the noise generated near the monitor signal changes in accordance with the frequency of the monitor signal. Therefore, by obtaining the frequency of the monitor signal and the level of the noise generated near the monitor signal, the group delay difference $\Delta\tau$ can be calculated.

Further, in the multimode optical transmission systems 3a and 3b according to the present embodiment, the multimode optical transmission line 310 and the multimode optical transmission line 320 may share a common multimode optical transmission line. For example, in each of the multimode optical transmission systems 3a and 3b, the optical transmitter and the optical receiver transmit the respective wavelength-multiplexed optical signals via the same multimode optical transmission line, whereby it is possible to calculate the group delay difference $\Delta\tau$ between the reference mode and the first-order mode with enhanced accuracy.

As described above, the multimode optical transmission system according to the third embodiment of the present invention can change the frequency of the superimposed signal so as to monitor and estimate a distortion component of the modulated signal. Therefore, the group delay difference Δτ generated in the multimode optical transmission line 310 can be estimated without using the short pulse signal generation section 141 as described for the first embodiment. The multimode optical transmission system 3 according to the present embodiment can estimate, even when the number of modes is plural, the group delay difference Δτ generated in the multimode optical transmission line 310 in the similar manner to that described above.

The multimode optical transmission system of the present invention is useful for, for example, reducing the deterioration of the noise characteristic and the distortion characteristic caused by the interference between modes.

While the invention has been described in detail, the foregoing description is in all aspects illustrative and not restrictive. It is understood that numerous other modifications and variations can be devised without departing from the scope of the invention.

What is claimed is:

1. A multimode optical transmission apparatus for converting an inputted electrical signal into an optical signal and transmitting the optical signal via a multimode optical transmission medium, the multimode optical transmission apparatus comprising:
    a signal output section for outputting a predetermined signal in accordance with the inputted electrical signal;
    a control section for causing the signal output section to adjust a frequency component of the predetermined signal; and
    an electric-optic conversion section for converting the predetermined signal into an optical signal and transmitting the optical signal via the multimode optical transmission medium,
    wherein the signal output section includes:
        a modulation section for modulating the inputted electrical signal and outputting the modulated signal as a high frequency modulated signal;
        a superimposed signal generation section for generating a signal having a predetermined frequency and outputting the generated signal as a superimposed signal; and
        a multiplexer section for frequency-multiplexing the superimposed signal with the high frequency modulated signal outputted by the modulation section, and outputting the frequency-multiplexed signal as the predetermined signal, and
    wherein the control section adjusts a frequency of the superimposed signal outputted by the superimposed signal generation section using the group delay information of each mode of propagation which propagates in the multimode optical transmission medium.

2. The multimode optical transmission apparatus according to claim 1, wherein the control section adjusts the frequency of the superimposed signal outputted by the superimposed signal generation section so that a harmonic component of the superimposed signal does not overlap with a band of the high frequency modulated signal outputted by the modulation section.

3. The multimode optical transmission apparatus according to claim 1, further comprising a mode group delay information estimation section for estimating the group delay information of each mode of propagation which propagates in the multimode optical transmission medium, wherein
    the mode group delay information estimation section includes:
        a short pulse signal generation section for generating a short pulse signal;
        a photoelectric conversion section for converting, into an electrical signal, an optical signal received via the multimode optical transmission medium; and
        a comparison calculation section for comparing the short pulse signal generated by the short pulse signal generation section with the electrical signal into which the photoelectric conversion section has converted the optical signal, and calculating the group delay information of each mode of propagation which propagates in the multimode optical transmission medium,
    the electric-optic conversion section converts, into the optical signal, the short pulse signal generated by the short pulse signal generation section, and transmits the optical signal via the multimode optical transmission medium, and
    the optical signal received via the multimode optical transmission medium contains the short pulse signal generated by the short pulse signal generation section.

4. The multimode optical transmission apparatus according to claim 1, wherein
    an optical signal received via the multimode optical transmission medium contains the predetermined signal outputted by the signal output section,
    the multimode optical transmission apparatus further comprises a mode group delay information estimation section for estimating the group delay information of each mode of propagation which propagates in the multimode optical transmission medium, and
    the mode group delay information estimation section includes:
        a photoelectric conversion section for converting, into an electrical signal, the optical signal received via the multimode optical transmission medium, and outputting the electrical signal as the predetermined signal; and
        a comparison calculation section for comparing the predetermined signal outputted by the signal output section with the predetermined signal outputted by the photoelectric conversion section, calculating an amount of one of a distortion and a noise which are generated in the multimode optical transmission medium, and estimating the group delay information of each mode of propagation which propagates in the multimode optical transmission medium using the calculated amount of one of the distortion and the noise.

5. The multimode optical transmission apparatus according to claim 1, wherein the control section calculates the group delay information of each mode of propagation which propagates in the multimode optical transmission medium using a length of the multimode optical transmission medium.

6. The multimode optical transmission apparatus according to claim 1, wherein the control section adjusts the frequency component of the predetermined signal using a group delay difference Δτ between predominant modes of propagation which propagate in the multimode optical transmission medium.

7. The multimode optical transmission apparatus according to claim 1, wherein
    Δτ represents a group delay difference between a first mode of propagation and a second mode of propagation, each of which propagates in the multimode optical transmission medium, and n is an arbitrary natural number, and
    the modulation section sets a frequency of the high frequency modulated signal to a frequency obtained as $n \times 1/\Delta\tau$.

8. The multimode optical transmission apparatus according to claim 1, wherein

Δτ represents a group delay difference between a first mode of propagation and a second mode of propagation, each of which propagates in the multimode optical transmission medium, and n is an arbitrary natural number, and the modulation section sets a frequency of the high frequency modulated signal to a frequency which is greater than $(n-\frac{1}{4})\times 1/\Delta\tau$ and smaller than $(n+\frac{1}{4})\times 1/\Delta\tau$.

9. The multimode optical transmission apparatus according to claim 1, wherein

Δτ represents a group delay difference between a first mode of propagation and a second mode of propagation, each of which propagates in the multimode optical transmission medium, and n is an arbitrary natural number, and the superimposed signal generation section sets the frequency of the superimposed signal to a frequency obtained as $(n-\frac{1}{2})\times 1/\Delta\tau$.

10. The multimode optical transmission apparatus according to claim 1, wherein

Δτ represents a group delay difference between a first mode of propagation and a second mode of propagation, each of which propagates in the multimode optical transmission medium, and n is an arbitrary natural number, and the superimposed signal generation section sets the frequency of the superimposed signal to a frequency which is different from a frequency obtained as $n\times 1/\Delta\tau$.

11. A multimode optical transmission apparatus for converting an inputted electrical signal into an optical signal and transmitting the optical signal via a multimode optical transmission medium, the multimode optical transmission apparatus comprising:

a signal output section for outputting a predetermined signal in accordance with the inputted electrical signal;

a control section for causing the signal output section to adjust a frequency component of the predetermined signal; and an electric-optic conversion section for converting the predetermined signal into an optical signal and transmitting the optical signal via the multimode optical transmission medium, wherein the inputted electrical signal is a baseband signal, wherein the signal output section includes:

a superimposed signal generation section for generating a signal having a predetermined frequency and outputting the generated signal as a superimposed signal; and a multiplexer section for frequency-multiplexing the baseband signal with the superimposed signal and outputting the frequency-multiplexed signal as the predetermined signal, and wherein the control section adjusts a frequency of the superimposed signal outputted by the superimposed signal generation section using the group delay information of each mode of propagation which propagates in the multimode optical transmission medium.

12. The multimode optical transmission apparatus according to claim 4, further comprising a mode group delay information estimation section for estimating the group delay information of each mode of propagation which propagates in the multimode optical transmission medium, wherein the mode group delay information estimation section includes:

a short pulse signal generation section for generating a short pulse signal;

a photoelectric conversion section for converting, into an electrical signal, an optical signal received via the multimode optical transmission medium; and a comparison calculation section for comparing the short pulse signal generated by the short pulse signal generation section with the electrical signal into which the photoelectric conversion section has converted the optical signal, and calculating the group delay information of each mode of propagation which propagates in the multimode optical transmission medium, the electric-optic conversion section converts, into the optical signal, the short pulse signal generated by the short pulse signal generation section, and transmits the optical signal via the multimode optical transmission medium, and the optical signal received via the multimode optical transmission medium contains the short pulse signal generated by the short pulse signal generation section.

13. The multimode optical transmission apparatus according to claim 11, wherein an optical signal received via the multimode optical transmission medium contains the predetermined signal outputted by the signal output section, the multimode optical transmission apparatus further comprises a mode group delay information estimation section for estimating the group delay information of each mode of propagation which propagates in the multimode optical transmission medium, and the mode group delay information estimation section includes:

a photoelectric conversion section for converting, into an electrical signal, the optical signal received via the multimode optical transmission medium, and outputting the electrical signal as the predetermined signal; and a comparison calculation section for comparing the predetermined signal outputted by the signal output section with the predetermined signal outputted by the photoelectric conversion section, calculating an amount of one of a distortion and a noise which are generated in the multimode optical transmission medium, and estimating the group delay information of each mode of propagation which propagates in the multimode optical transmission medium using the calculated amount of one of the distortion and the noise.

14. The multimode optical transmission apparatus according to claim 11, wherein the control section calculates the group delay information of each mode of propagation which propagates in the multimode optical transmission medium using a length of the multimode optical transmission medium.

15. The multimode optical transmission apparatus according to claim 11, wherein the control section adjusts the frequency component of the predetermined signal using a group delay difference Δτ between predominant modes of propagation which propagate in the multimode optical transmission medium.

16. A multimode optical transmission system comprising an optical transmitter for converting an inputted electrical signal into an optical signal and transmitting the optical signal via a multimode optical transmission medium and an optical receiver for receiving the optical signal via the multimode optical transmission medium wherein the optical transmitter includes:
- a signal output section for outputting a predetermined signal in accordance with the inputted electrical signal;
- a control section for causing the signal output section to adjust a frequency component of the predetermined signal; and
- an electric-optic conversion section for converting the predetermined signal into an optical signal and transmitting the optical signal via the multimode optical transmission medium, wherein the optical receiver includes a photoelectric conversion section for converting, into an electrical signal, the optical signal received via the multimode optical transmission medium, wherein the signal output section includes:
- a modulation section for modulating the inputted electrical signal and outputting the modulated signal as a high frequency modulated signal;
- a superimposed signal generation section for generating a signal having a predetermined frequency and outputting the generated signal as a superimposed signal; and
- a multiplexer section for frequency-multiplexing, with the superimposed signal the high frequency modulated signal outputted by the modulation section, and outputting the frequency-multiplexed signal as the predetermined signal, and wherein the control section adjusts a frequency of the superimposed signal outputted by the superimposed signal generation section using the group delay information of each mode of propagation which propagates in the multimode optical transmission medium.

17. A multimode optical transmission method for converting an inputted electrical signal into an optical signal and transmitting the optical signal via a multimode optical transmission medium, the method comprising:
- modulating the inputted electrical signal and outputting the modulated signal as a high frequency modulated signal;
- generating a signal having a predetermined frequency and outputting the generated signal as a superimposed signal;
- adjusting a frequency of the superimposed signal, outputted by said outputting of the generated signal as the superimposed signal, using the group delay information of each mode of propagation which propagates in the multimode optical transmission medium;
- frequency-multiplexing, with the superimposed signal, the high frequency modulated signal outputted by said outputting of the modulated signal as the high frequency modulated signal, and outputting the frequency-multiplexed signal as a predetermined signal; and
- converting the predetermined signal into an optical signal and transmitting the optical signal via the multimode optical transmission medium.

* * * * *